United States Patent [19]

Geary

[11] Patent Number: 4,798,047
[45] Date of Patent: Jan. 17, 1989

[54] PARTICULATE COLLECTION AND COOLING IN A TURBOMACHINE

[75] Inventor: Carl H. Geary, Greensburg, Pa.

[73] Assignee: Elliott Turbomachinery Co., Inc., Jeannette, Pa.

[21] Appl. No.: 562,614

[22] Filed: Dec. 19, 1983

[51] Int. Cl.⁴ ............................................. F02G 3/00
[52] U.S. Cl. ................................. 60/39.092; 60/39.5; 415/144; 415/121 A
[58] Field of Search ..................... 60/39.092, 39.5; 415/144, 121 A, 168, 115, 116

[56] References Cited

U.S. PATENT DOCUMENTS

| | | | |
|---|---|---|---|
| 892,206 | 6/1908 | Apple | |
| 2,241,782 | 5/1941 | Jendrassik | 253/69 |
| 2,288,734 | 7/1942 | Novack | 60/39.464 |
| 2,341,664 | 2/1944 | Schutte | 60/41 |
| 2,625,793 | 1/1953 | Mierley et al. | 60/39.65 |
| 3,034,298 | 5/1962 | White | 60/39.66 |
| 3,066,912 | 12/1962 | Scheper, Jr. | 253/75 |
| 3,142,155 | 7/1964 | Levesque et al. | 60/39.66 |
| 3,274,757 | 9/1966 | Wapler | 55/238 |
| 3,338,049 | 8/1967 | Fernberger | 60/39.09 |
| 3,362,155 | 1/1968 | Driscoll | 60/39.09 |
| 3,380,711 | 4/1968 | Blattner et al. | 253/76 |
| 3,535,873 | 10/1970 | Szydlowski | 415/117 |
| 3,720,045 | 3/1973 | Murphy | 55/306 |
| 3,905,197 | 9/1975 | Miller | 60/646 |
| 3,936,220 | 2/1976 | Henderson | 415/178 |
| 3,993,463 | 11/1976 | Barr | 55/306 |
| 4,127,357 | 11/1978 | Patterson | 415/116 |
| 4,155,684 | 5/1979 | Curiel et al. | 415/199.2 |

FOREIGN PATENT DOCUMENTS

| | | | |
|---|---|---|---|
| 640104 | 7/1950 | United Kingdom | 415/121 G |
| 2001707 | 2/1979 | United Kingdom | 415/121 A |

Primary Examiner—Louis J. Casaregola
Assistant Examiner—T. S. Thorpe
Attorney, Agent, or Firm—Webb, Burden, Ziesenheim & Webb

[57] ABSTRACT

A power recovery expander for use with a motive fluid of hot gas with entrained particulates is disclosed. Means for removal of entrained particulates and for cooling portions of the turbomachine are provided. Additionally, cooling fluid is directed to a separate cooling chamber, said cooling fluid being used to draw additional particulate matters from the motive fluid.

14 Claims, 1 Drawing Sheet

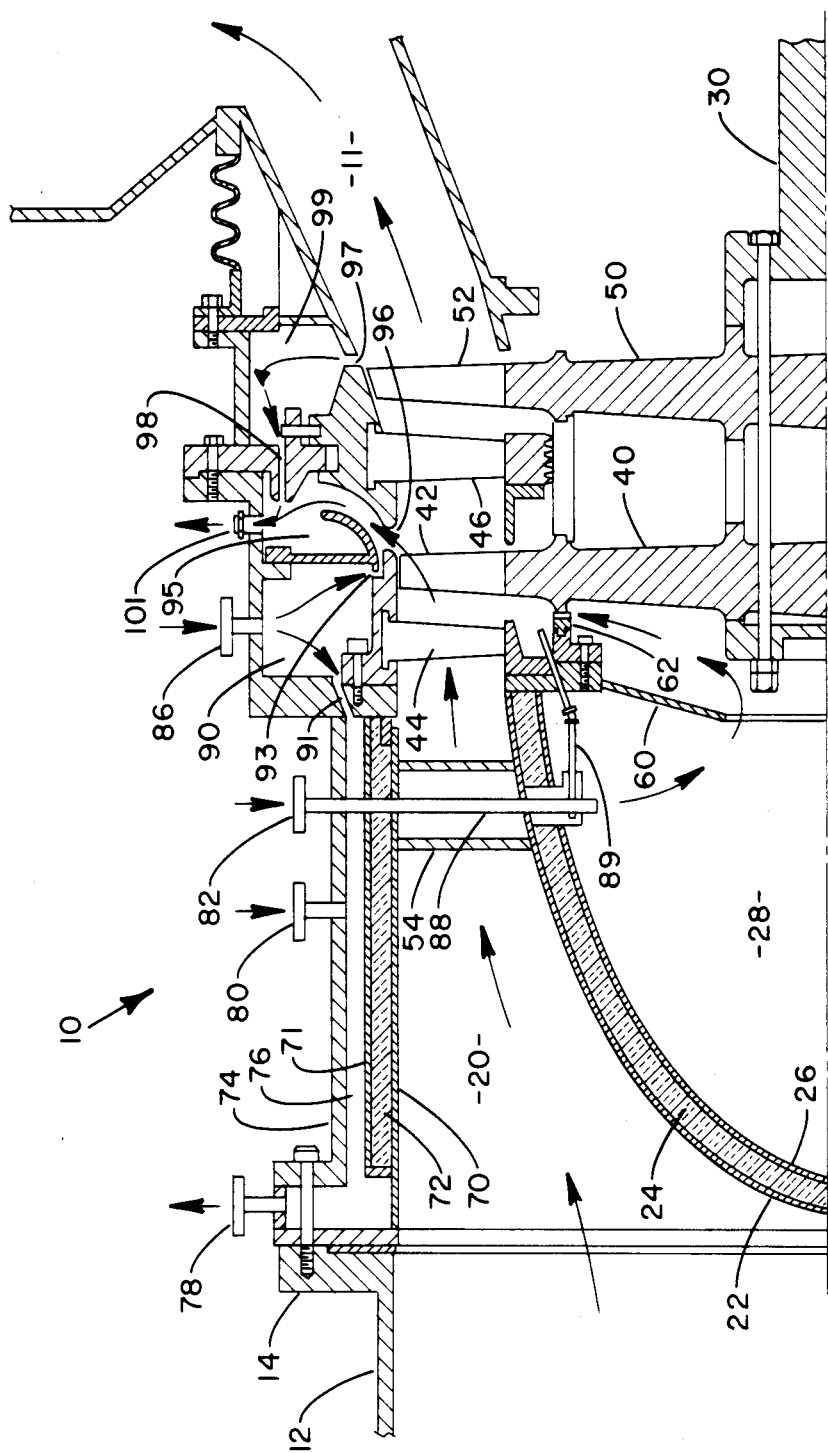

PARTICULATE COLLECTION AND COOLING IN A TURBOMACHINE

BACKGROUND OF THE INVENTION

Field of the Invention

This invention relates to particulate collection and cooling in a turbomachine particularly the type of turbomachine known as a power expander. In many processes, high temperature often times wasted, gases containing high concentrations of solid materials thus rendering the gases suitable for use as a working fluid within a turbine or such other power recovery equipment are utilized. The present invention concerns recovering energy from this working fluid.

Due to the increasing energy shortage, methods of recovering heretofore wasted energy are being looked towards as a potential source of power. A typical process which produces a great deal of energy that is normally wasted is found in the coal gasification industry. In coal gasification, high temperature exhaust gases are generated as a byproduct of the process. Because of the nature of the process, these hot gases contain a very high percentage of solid waste materials in the form of fly ash, dolomite and the like.

The use of this potentially high energy source in power recovery equipment has proven difficult because the recovery equipment is subjected to catastrophic failure resulting from blade erosion under the action of solid waste particles and/or material fatigue caused by high operating temperatures. Furthermore, to compound difficulties it has been found that the erosion rate increases with increases in gas temperatures.

Another process in which particulates are found in high energy gases is the fluid catalytic cracking process found in the petroleum industry. The catalyst may be entrained in the hot gas stream such that it enters the expander as a particulate thereby contributing to blade erosion.

In order to obtain maximum efficiency, the gas must be used at the hottest temperature possible. Special alloys are necessary if components are in contact with gases above the 1250° F. to 1300° F. range and are allowed to become heated to this temperature range. In order to avoid the expense of utilizing alloys which retain their strength at these high temperatures it is necessary to cool the materials involved to allow the use of less expensive, more workable materials.

SUMMARY OF THE INVENTION

It is an object of the present invention to provide a turbomachine which converts the energy in a hot gas stream into mechanical energy.

It is another object of the present invention to provide means for effectively cooling portions of a turbomachine.

It is a still further object of the present invention to provide enhanced particulate collection means within a turbomachine.

It is a still further object of the present invention to provide a power recovery expander capable of operating with high gas temperatures.

It is a further object of the present invention to effectively utilize high temperature hot gases by separating particulates from the gases and by providing cooling fluid to maintain the components of a turbomachine in communication with the hot motive fluid at a lower temperature than the gases such that special metals are not required.

It is another object of the present invention to provide a safe, economical and reliable power recovery expander which may operate over a wide temperature range.

These and other objects of the present invention are achieved according to a preferred embodiment by the provision of a power recovery expander for use with a motive fluid of hot gas with entrained particulates. The power recovery expander has a first rotor including a first stage of blades mounted in a stream of hot gas, an annular collection means defining a receiving chamber located downstream and radially outward of the first stage of blades including an inlet portion for receiving particulates directed outwardly by the blades, a series of first stator blades located upstream from the first stage of blades, means for cooling the first stator blades including means defining a cooling chamber in heat exchange relationship with the first stator blades, said cooling chamber being connected to receive a cooling gas and outlet means defining a passageway extending from the cooling chamber to the receiving chamber to direct at least a portion of the cooling gas into the receiving chamber to assist in displacing the particulates into the receiving chamber. The invention further includes a passageway extending from the cooling chamber to the receiving chamber which enters the receiving chamber adjacent the inlet to the receiving chamber and in a generally parallel flow direction with the hot gas and particulates entering through the inlet such that the flow of cooling gas acts as an ejector drawing additional hot gas and particulates into the receiving chamber.

A turbomachine for use with a motive fluid of hot gas is additionally disclosed. This turbomachine includes a first series of stator blades mounted in the motive fluid, a first stage of rotor blades mounted to a shaft and being within the motive fluid stream downstream of the first series of stator blades, a second series of stator blades mounted in the motive fluid downstream from the first stage of rotor blades, a second series of rotor blades mounted to the shaft and being within the motive fluid stream downstream of the second series of stator blades, means for supporting the second stage stator blades and for defining an exhaust chamber, said means further defining an inlet to the exhaust chamber downstream from one of the rotor blades such that relatively cool expanded gas may enter the exhaust chamber from the motive fluid to effectively cool the stator blades.

BRIEF DESCRIPTION OF THE DRAWING

FIG. 1, the only drawing herein, discloses a partial sectional view of a power recovery expander showing multiple stator and rotor stages.

DESCRIPTION OF THE PREFERRED EMBODIMENT

The embodiment as described herein will refer particularly to a power recovery expander. It is to be understood by those skilled in the art that the invention as described herein is applicable to any type of turbomachine. Additionally, although as shown as a two stage power recovery expander, it is to be further understood that the number of stages does not necessarily effect the scope of the invention herein and that the invention could be applied with a single stage machine or a machine having more stages than those shown.

FIG. 1 shows a power recovery expander 10 capable of converting energy contained in a motive fluid, typically of hot gas with entrained particulates into shaft energy. This turbomachine is designed such that it may be made of materials which are capable of limited high temperature use but which are significantly less expensive than exotic alloys which are capable of high temperature use. The use of exotic alloys is considered disadvantageous due to their lack of availability, cost and difficulty in manufacturing and workability.

Referring to FIG. 1 there can be seen a partial sectional view of a power expander. The hot motive fluid enters from the left through conduit 12 into inlet area 20. The fluid then flows from left to right passing by strut 54, through first stage stator blade 44, through first stage rotor blade 42, through second stage stator blade 46, through second stage rotor blade 52 into exhaust area 11. The gas, as it travels therethrough, is expanded at each rotor stage such that its temperature is decreased and energy is removed therefrom.

Shell 70 is shown about inlet area 20 defining the outer perimeter thereof. Shell 70 is made with materials such as stainless steel or hastelloy, capable of retaining long term integrity under fairly high temperatures. Insulation 72 is shown mounted radially outward from shell 70 and shell 71 is mounted radially outward therefrom such that insulation is maintained between shell 70 and 71. Casing 74 is mounted radially outward from shell 71 such that annular cavity 76 is defined by shell 71 and casing 74. An inlet 80 is shown for directing a cooling fluid into the cavity 76 wherein the cooling fluid flows around the perimeter of the machine and is exhausted through discharge 78. This cooling fluid may typically be steam or some other gas which acts to absorb heat energy being transferred from shell 70 through insulation 72 to shell 71. This cooling allows the materials making up shell 71 and casing 74 to be materials capable of lesser high temperature strength. Additionally, should sufficient cooling gas be supplied, then the insulation may not be required except in extreme temperature applications.

The inner surface which defines inlet area 20 is inlet disk 22, typically made of hastelloy or stainless steel. Insulation 24 is mounted inside of inlet disk 22 and is maintained in position by inner cover 26. Inner cover 26 defines a central chamber 28 in the turbomachine.

Strut 54 is shown extending from shell 70 to inlet disk 22 and defines an opening through which conduit 88 extends. Inlet 82 is shown for delivering cooling fluid through conduit 88 which is then directed into chamber 28 in the center of the turbomachine. This fluid is then circulated through inner chamber 28 to cool the inner cover 26 and the inlet disk 22 through insulation 24. This cooling fluid is then directed around bulkhead 60 and upwardly through passageway 62 adjacent the first stage rotor disk 40. This cooling fluid is then directed upwardly into first stage rotor blades 42 and directed along with the motive fluid out through exhaust area 11. Conduit 89 is shown connected to conduit 88 for directing cooling fluid to the exterior of the first stage rotor 40 and the radially inward portion of first stage rotor blade 42 to effect cooling of same. Again, any cooling fluid flow through conduit 89 is directed into the motive fluid stream and out through exhaust area 11. Second stage disk 50 is shown mounted about shaft 30 as is first stage rotor disk 40. Second stage disk blades 52 are shown mounted to the second stage disk.

A cooling chamber 90 is shown mounted circumferentially about the turbomachine in heat exchange relation with first stage stator blades 44. Cooling fluid is fed through inlet 86 into cooling chamber 90. This cooling fluid may flow through outlet 91 into cavity 76 and out through discharge 78. Additionally, some of the cooling fluid flows in the opposite direction through outlet 93 to a separate receiving chamber 95. The cooling fluid flowing into cooling chamber 90 not only serves to cool first stage stator 44 but additionally serves to cool casing 74 and shell 71.

Shown immediately downstream from the cooling chamber is a receiving chamber 95. Receiving chamber 95 has an inlet 96 which is arranged to be radially outward from first stage rotor blades 40 and slightly downstream therefrom. This opening is angled from the direction of flow of the motive fluid and is so arranged that particulates accelerated by first stage rotor blades 42 are directed outwardly and, by centrifugal force, flow into inlet opening 96; The centrifugal force acts to force the heavy particulates outwardly while the gas flows more directly therethrough. The particulates enter receiving chamber 95 through inlet 96 and are collected within the chamber. Outlet 101 is typically located at the bottom of the chamber such that the particulates are withdrawn therefrom by gravity. Cooling fluid from chamber 90 is shown being directed through outlet 93 generally parallel to the flow of particulates through inlet 96 into the receiving chamber 95. This flow through outlet chamber 93 acts as an ejector serving to draw particulates to the inlet 96 such that they may be collected within the receiving chamber. Additionally, this cooling fluid flowing through outlet 93 acts to cool the mixture of gas flowing into receiving chamber 95. Gas flowing into receiving chamber 95 is additionally cooled since it has been expanded as it flows through first stage rotor blade 42 and hence is at a lesser temperature.

Second stage stator 46 is secured by the apparatus which helps define both receiving chamber 95 and exhaust chamber 99. This apparatus is in heat exchange relation with both the second stage stator and with the fluid within the receiving chamber 95. Hence, both the expanded gas flowing through inlet 96 to receiving chamber 95 and the cooling fluid flowing from cooling chamber 90 through outlet 93 into the receiving chamber serve to cool second stage stator 46.

Exhaust chamber 99 is shown mounted annularly about the turbomachine and has an inlet 97 located immediately downstream from second stage rotor blade 52. Inlet 97 is positioned such that the expanded and cooled gas which has been discharged from the second stage rotor blade is allowed to enter the exhaust chamber. Within the exhaust chamber this cooled gas acts to absorb heat energy from second stage stator 46, cooling same. This same gas is then exhausted through passageway 98 communicating the exhaust chamber 99 with the receiving chamber 95 such that this same cool gas may additionally act to cool the mixture within receiving chamber 95 and further cool second stage stator 46. This gas received through the exhaust gas chamber is then exhausted through outlet 101 in the same manner as the gas received from cooling chamber 90 and inlet 96 into the receiving chamber.

Hence, as described herein, there has been particularly set out means for cooling stator blades using expanded gas developed by the rotary blades. Additionally, it has been disclosed using this same expanded gas to cool multiple portions of a structure connected to a stator blade. Additionally, there is disclosed utilizing the input of additional cooling fluid to serve as an ejector for helping to remove particulates from the motive fluid stream. Additionally, the particulates and gas discharged therefrom are collected within a receiving chamber which also serves to effect cooling of the stator blades. Hence, multiple functions are achieved using cooling chambers in the appropriate positions.

The invention has been described with reference to a particular embodiment thereof. It is to be understood by those skilled in the art that variations and modifications can be effected within the spirit and scope of the invention.

What is claimed is:

1. A power recovery expander for use with a stream of hot gas with entrained particulates which comprises:
    a rotor including a first stage of blades mounted in the stream of hot gas;
    an annular collection means defining a receiving chamber located downstream and radially outward of the first stage of blades including an inlet positioned to receive particulates directed outwardly by the blades;
    a series of first stator blades located upstream from the first stage of blades;
    means for cooling the first stator blades including means defining a cooling chamber in heat exchange relationship with the first stator blades, said cooling chamber being connected to receive a cooling gas; and
    outlet means defining a passageway extending from the cooling chamber to the receiving chamber to direct at least a portion of the flow of cooling gas into the receiving chamber whereby said portion of the flow of cooling gas acts to assist in displacing the particulates into the receiving chamber.

2. The apparatus as set forth in claim 1 wherein the passageway extending from the cooling chamber to the receiving chamber enters the receiving chamber adjacent the inlet to the receiving chamber whereby the flow of cooling gas acts as an ejector drawing additional hot gas and particulates into the receiving chamber.

3. The apparatus as set forth in claim 2 wherein the rotor includes a second stage of blades mounted downstream from the first stage of blades and further comprising:
    a series of second stator blades mounted in the hot gas between the first rotor and the second rotor; and
    wherein the annular collection means includes means for supporting the second stator blades in heat exchange relation with the annular collection means to effect cooling of said blades.

4. The apparatus as set forth in claim 3 and further comprising means defining an annular exhaust chamber located downstream from the second stage of rotor blades and extending radially outward therefrom, said means also defining an inlet for allowing relatively cool expanded exhaust gas to enter the exhaust chamber.

5. The apparatus as set forth in claim 4 wherein the means defining the annular exhaust chamber further comprises means in heat exchange relation with the second series of stator blades such that the gas flowing through the exhaust chamber acts to cool the second stator blades.

6. The apparatus as set forth in claim 4 wherein the means defining the annular exhaust chamber further defines a passageway extending from the exhaust chamber to the collection chamber to allow cool gas from the exhaust chamber to flow into the collection chamber.

7. A turbomachine for use with a motive fluid of hot gas which comprises:
    a first series of stator blades mounted in the motive fluid;
    a first stage of rotor blades mounted to a shaft and being within the motive fluid stream downstream of the first series of stator blades;
    a second series of stator blades mounted in the motive fluid downstream from the first stage of rotor blades;
    a second series of rotor blades mounted to the shaft and being within the motive fluid stream downstream of the second series of stator blades; and
    means for supporting the second stage stator blades and for defining an exhaust chamber, said means further defining an inlet to the exhaust chamber downstream from one of the rotor blades such that relatively cool expanded gas may enter the exhaust chamber from the motive fluid to effectively cool the stator blades.

8. The apparatus as set forth in claim 7 and further comprising means defining a receiving chamber in heat exchange relation with the second stator blades and an inlet to the receiving chamber from the motive fluid, whereby said cool expanded motive fluid may enter the receiving chamber and absorb heat energy from the second stator blades to effectively cool same.

9. The apparatus as set forth in claim 8 wherein the means for supporting the second stage stator blades further defines a passageway between the receiving chamber and the exhaust chamber for allowing gas flow therebetween.

10. The apparatus as set forth in claim 7 and further comprising means for supporting the first series of stator blades which additionally defines a cooling chamber in heat exchange relation with the first series of stator blades and inlet means for allowing a cooling fluid to flow into the cooling chamber.

11. The apparatus as set forth in claim 10 wherein the means for supporting the first series of stator blades additionally defines a passageway extending from the cooling chamber to the receiving chamber to direct the cooling fluid from the cooling chamber to the receiving chamber to assist in cooling the second series of stator blades.

12. The apparatus as set forth in claim 8 wherein the first rotor blades have a radially outward end and wherein the inlet of the receiving chamber is positioned relative to the radially outward end of the first rotor blades to receive particulates discharged therefrom.

13. The apparatus as set forth in claim 12 and further comprising the support means defining a passageway for a cooling fluid, said passageway extending into the receiving chamber whereby the flow of a cooling fluid through said passageway acts to draw particulates from the motive fluid into the receiving chamber.

14. The apparatus as set forth in claim 13 and further comprising a discharge valve connected to the receiving chamber and defining an outlet for removing particulates from the receiving chamber.

* * * * *